Patented Jan. 31, 1950

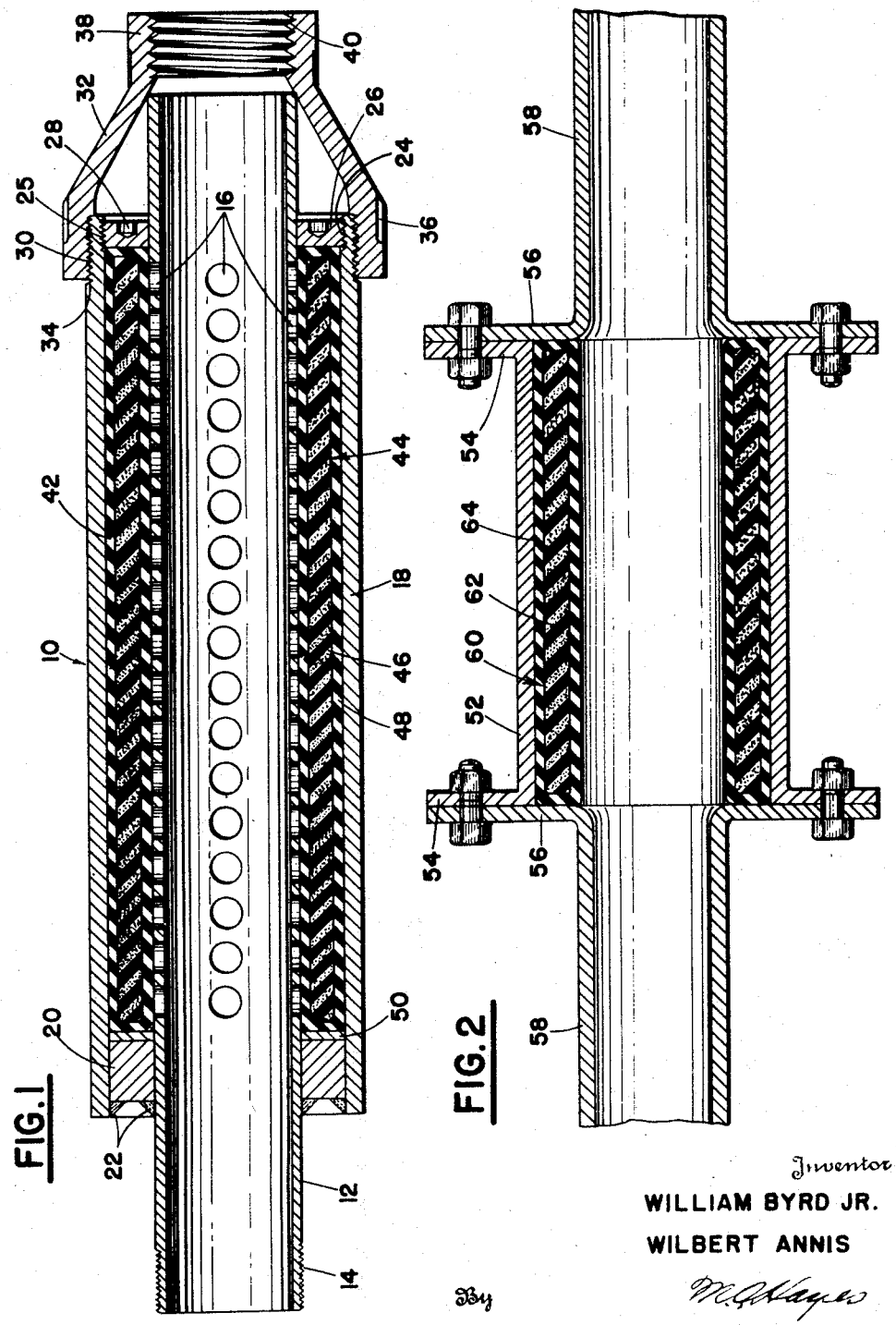

2,495,693

UNITED STATES PATENT OFFICE 2,495,693

HYDRAULIC SURGE DAMPER

William Byrd, Jr., and Wilbert Annis,
United States Navy

Application March 26, 1946, Serial No. 657,317

2 Claims. (Cl. 138—26)

(Granted under the act of March 3, 1883, as
amended April 30, 1928; 370 O. G. 757)

This invention relates to an improvement in hydraulic piping systems and more particularly to a device to minimize damage to hydraulic systems due to excessive pressures caused within the system.

The destructive effect of surges such as are caused by water hammer or the pulsation of piston pumps and other devices which cause uneven flow and of freezing in water pipes is well known. Various means have been provided for use in such systems for minimizing the destructive stresses and excessive pressures set up in piping the most common of which are spring loaded valves, air chambers, expansion joints and expansion chambers. Devices of this character require too much attention, are expensive to install and are not well suited to damping out continuous pulsations which occur at high rates as high as 50 pulsations per second and above. Spring load valves and expansion devices especially those including diaphragm or bellows are unsatisfactory because they are subject to rapid failure. Air chambers are generally unsatisfactory because of the rapid loss of air due to absorption and entrainment in the liquid.

It is an object of the invention, therefore, to provide an improved relief device adapted to be interposed in a hydraulic pipe system for damping out continued pulsations of flow or rapid successions of pressure surges and hence to minimize the disruptive forces and excessive pressure produced by water hammer and/or freezing under substantially any circumstances; which is easy to install, easy to maintain, and will occupy a minimum of space.

In its broadest aspects, invention resides in a device which comprises means interposed in a hydraulic pipe line including a space into which the fluid passing through the pipe may expand under pressure and means associated therewith which normally occupies the aforesaid space and excludes the fluid therefrom but which will yield under pressure radially of the axis of the pipe to allow the fluid to enter the space and hence to dissipate surge or pulsation due to fluid hammer or expansion due to freezing. As illustrated, there is interposed in the hydraulic pipe line a section of pipe of somewhat larger diameter, in which there is disposed a sleeve of yieldable material, preferably sponge rubber, having an internal diameter substantially equal to the internal diameter of the hydraulic pipe line. To be most effective the yieldable means is preferably nonabsorptive of the water, and hence is enclosed in an envelope of impervious material. In a more specific form of the invention the device comprises a length of pipe having perforations in its peripheral wall and surrounding the perforated portion is a sleeve of larger diameter thereby forming an annular space between the outside of the pipe and the inside of the sleeve. The ends of the annular space are sealed by interposing end plates between the sleeve and the pipe, one of which may be removable and in this closed annular space there is disposed a resilient sponge rubber sleeve having an impervious coating. The pipe is threaded at one end so that it may be engaged by mating threading at one end of the interrupted hydraulic pipe line into which it is interposed and a cap is threaded onto the opposite end of the sleeve the terminal end of the cap being internally threaded to permit coupling it to the opposed end of the interrupted hydraulic pipe line.

The invention will now be described in detail with reference to the accompanying figures in which Figure 1 is a longitudinal section through the preferred form of the device and Figure 2 is a longitudinal section through a modified and somewhat simpler form of the device.

Referring to Figure 1, the device 10 comprises a section of pipe 12 threaded at one end at 14 so that it may be connected at that end to the hydraulic pipe system into which it is to be interposed. The section of pipe 12 is provided with a plurality of perforations 16 preferably formed in the wall of the pipe along lines that are 90° apart circumferentially. A sleeve 18 of somewhat larger diameter than the pipe 12 is disposed about the pipe 12 in concentric relation therewith over the perforated portion thereof and is secured to the pipe 12 at one end by an annular member 20 disposed between the sleeve and the pipe and welded in place as indicated at 22. The opposite end of the sleeve 18 is held concentric with the pipe 12 by an annular member 26 which is threaded externally at 24 to cooperate with internal threads 25 formed at the opposite end of the sleeve 18. Detents 28 are provided in the exposed surface of the member 26 to accommodate a wrench for inserting or removing the annular member 20. This latter end of the sleeve 18 is also externally threaded at 30 for receiving a cap 32 which is threaded internally at 34. Slots 36 formed on the outer surface of the cap 32 are provided to accommodate a spanner wrench thereby affording a means for screwing the cap onto the end of the sleeve or removing it therefrom. The terminal end of the cap 32 is necked down to approximately the diameter of the hydraulic pipe line as at 38 and is internally threaded at 40 so that it may be attached to the opposed end of the interrupted hydraulic pipe line.

An annular space 42 is formed between the sleeve 18 and the pipe 12 by the aforesaid assembly and in this annular space there is placed a resilient sleeve 44 which is preferably composed of a core of sponge rubber 46 enveloped in an impervious coating of rubber 48 so that the sponge rubber will not take up water. One common brand of sponge rubber which is particularly suitable is "Cell-tite." It is to be understood, however, that other yieldable material may be employed and that any suitable water proof coating may be applied to the material to prevent water from being absorbed. Such a coating it is to be understood, however, should not only protect the yieldable material from absorbing the water but should also exclude water from the body of the material. Prior to inserting the rubber sleeve 44 a ring 50 is disposed about the pipe 12 inside the sleeve 18 against the member 20. The purpose of the ring 50 is to prevent sticking of the end of the rubber sleeve to the member 20 so that it may readily be removed when it requires replacement.

It is evident from the construction of the device as described above that the device may readily be assembled or disassembled by removing the cap 32 and the member 26 and then slipping the rubber sleeve 44 longitudinally over the pipe 12 to insert it or remove it.

In a somewhat simpler form of the invention, Figure 2, a section of pipe 52 of somewhat larger diameter than the pipe 58 into which it is to be interposed is employed. In this form of the invention the section 52 is provided with flanges 54 by which it may be secured to corresponding flanges 56 of the opposed ends of the hydraulic pipe line 58. Within the section 52 there is disposed a rubber sleeve 60 having an internal diameter which is substantially the same as the internal diameter of the pipe line 58. As in the previous case, this rubber sleeve 60 consists of a sponge rubber core 62 and an impervious covering 64. In this form of the invention the assembly of the unit as a whole in the pipe line may be somewhat more readily accomplished and the rubber sleeve itself may more readily be removed and replaced when this becomes necessary.

While the invention is illustrated as installed in piping it is equally within the scope of the invention to employ a yieldable rubber body of the characteristics described above in tanks or other specially provided spaces in hydraulic systems to relieve excessive pressures and in all cases the volume of the rubber required is determined by the volume necessary to dissipate the expected pulsation, or surge or the conversion of water to ice as the case may be.

In either form of the invention when there are pulsations or surges due to water hammer the pressure created within the pipe is dissipated by compression of the rubber sleeve which results in a temporary increase in the internal diameter of the rubber sleeve and due to the resilience of the rubber it will function to damp out these pulsations regardless of the rapidity of their occurrence in contrast to mechanical means which tend to fail because of the inertia of the moving parts. In like manner as the water within the system begins to freeze, the destructive effects of the expansion of the water in forming ice may be relieved in part and perhaps enough to prevent destruction to the system by compressing the rubber sleeve.

The invention described herein may be manufactured and used by or for the Government of the United States of America for governmental purposes without the payment of any royalties thereon or therefor.

What is claimed is:

1. A device for use in a hydraulic line comprising a length of pipe interposable in the hydraulic line, said length of pipe having a plurality of perforations in its peripheral wall, a sleeve surrounding the perforated portion of said pipe, an annular disc interposed between the pipe and sleeve at one end thereof for securing the pipe to the sleeve, an annular disc threaded into the opposite end of the sleeve about the pipe to hold the latter end of the sleeve concentric with the pipe, said last named disc being removable, said sleeve and discs forming a closed annular chamber about the perforated position of the pipe and a resilient material disposed in said chamber.

2. The device of claim 1 wherein said resilient material is in the form of a readily removable and replaceable member comprising a sleeve of sponge rubber enclosed within an envelope of impervious rubber arranged to prevent sticking of said sleeve to said device.

WILLIAM BYRD, Jr.
WILBERT ANNIS.

REFERENCES CITED

The following references are of record in the file of this patent:

UNITED STATES PATENTS

| Number | Name | Date |
|---|---|---|
| 318,856 | Bilz | May 26, 1885 |
| 696,277 | Sponseller et al. | Mar. 25, 1902 |
| 994,167 | Koppitz | June 6, 1911 |
| 1,927,105 | Welch | Sept. 19, 1933 |

FOREIGN PATENTS

| Number | Country | Date |
|---|---|---|
| 17,403 | Great Britain | Aug. 6, 1896 |
| 104,257 | Australia | June 28, 1937 |